April 14, 1931.          M. L. CLELAND                1,800,716
                          SIDE AWNING
                      Filed Oct. 13, 1928        2 Sheets-Sheet 1
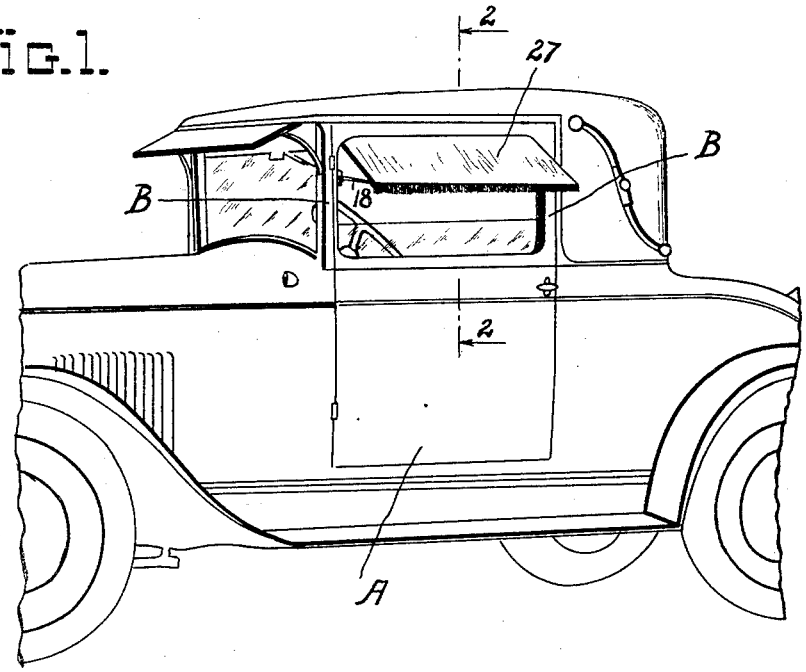
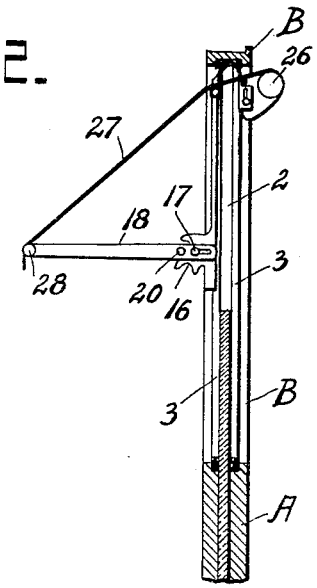 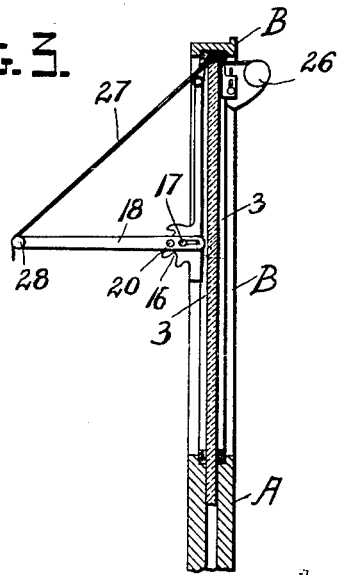
Inventor
M. L. Cleland
By Robt Roth
Attorneys April 14, 1931. M. L. CLELAND 1,800,716
SIDE AWNING
Filed Oct. 13, 1928  2 Sheets-Sheet 2
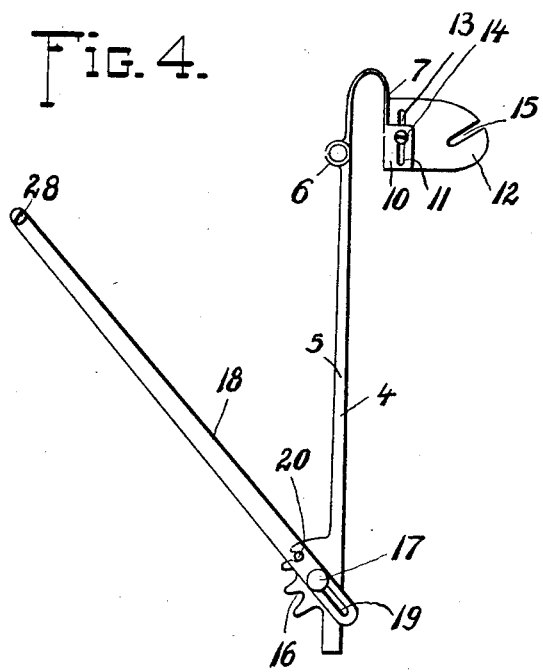
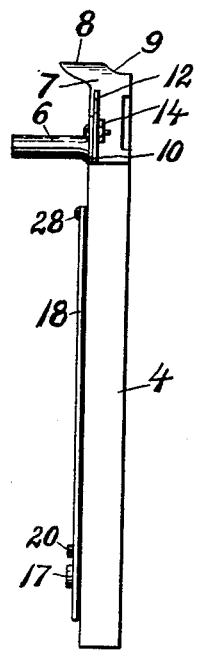
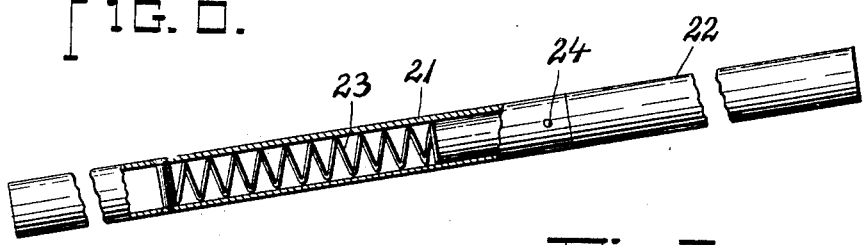
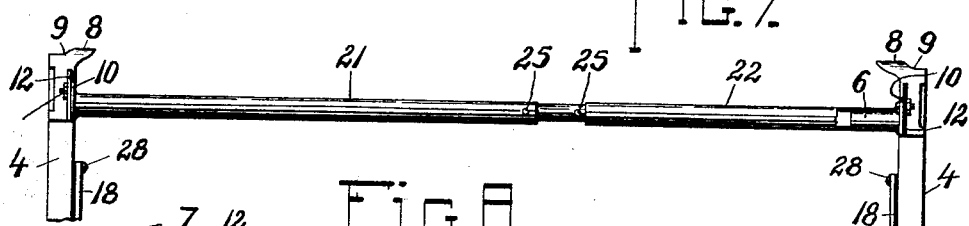
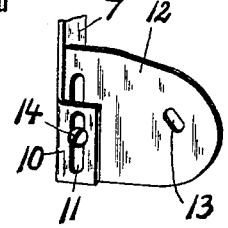
M. L. Cleland Inventor Patented Apr. 14, 1931

1,800,716

UNITED STATES PATENT OFFICE

MELVIN L. CLELAND, OF HASTINGS, NEBRASKA, ASSIGNOR TO G. A. ROTH MANUFACTURING COMPANY, OF HASTINGS, NEBRASKA, A CORPORATION

SIDE AWNING

Application filed October 13, 1928. Serial No. 312,356.

Among the important factors which are preventing a more universal use of automobile side awnings, is the fact that in the roller type awnings now available, it is impossible to have the awning in an extended position when the glass in the vehicle door is closed to such an extent as to render it water tight or dust proof. Naturally this condition is not favorable to the extensive use of these awnings with motor vehicles, and having taken recognition of this fact, I propose by this invention to provide an awning of the roller type which may be extended with the glass window of the vehicle closed. This feature, when incorporated into an awning, has the advantage of affording protection from the sun at the same time that the window is closed, the latter condition affording protection from the other elements as well as dust. Going a little farther, it is an object of this invention to provide an awning of the roller type which may be placed in any one of a plurality of extended positions, while the window element of the vehicle is in a closed position.

The devising of an awning in view of the objects above noted, immediately presents the problem of proper mounting of the same. It is now established in the field of commercial manufacture of these awnings, that the roller must be mounted inside of the vehicle; that is, with respect to the window. This is due not only to the conditions of actual mounting itself which take advantage of the construction of the window frame in mounting the awning, but also to the question of the appearance effect afforded by these awnings which is a paramount consideration. It is obvious that were the roller mounted outside of the window, a very ungainly and unpleasing appearance in construction would be evident, and as previously mentioned, it is accepted throughout this art that the roller must be mounted interiorly of the window glass.

Bearing the conditions above noted in mind, I have designed a side awning for vehicle bodies which is in favorable accordance with the said conditions. Moreover, an additional advantage of no little import is included in the arrangement of the mounting of the awning. Heretofore it has been the practice to affix these awnings to the frame of the door or window by using some fastening means such as screws or bolts. Such practice I aim to totally obviate by this invention, wherein the side members on which the awning roller is mounted as well as the side supporting arms are held in position in the frame in the window glass groove by friction. In this connection, the felt which is present in the grooves of the doors of all motor vehicle bodies of this type, is availed of as an aid in holding these side members in position.

Carrying out this idea more specifically and aiming at providing a rigid and positive mounting of the side members in the frame, I employ instrumentalities which continually exert a pressure against these side members as they are positioned in the groove of the frame as hereinbefore set out. More specifically, I avail of telescopic tubular members in one of which is located a spring and the ends of which fit over protuberances on the side members and which function, due to the expanding action of the spring, to press the side members against the frame structure thereby holding the latter positively in position.

In connection with this tubular expanding member which is employed as noted in the preceeding paragraph, a particular feature of the invention arises. I have reference to the fact that the commercial handling of these articles does not readily lend itself to the shipment of the side awnings with the components of the tubular expanding member in an expanding relation. I therefore provide means for holding the expanding members in a contracted relation during shipment, handling, and installation of the awnings, and which means is easily removable subsequent to the installation of the awning in a vehicle. One form of this means may be a pin which is inserted in aligned openings in the tubular parts, which prevents their relative movement.

It is a further object of the invention to provide an awning of the roller type which may be easily operated to place it in a plurality of extended positions or collapse the same, as occasion demands. This end I attain by providing a novel type of instrumentalities for holding the awning in any one of its extended positions. More specifically, the lower portion of each of the side members is formed with a series of ratchet teeth in a semi-circular arrangement, and each of the side supporting arms provided with a projection or pin member which is adapted to cooperate with the ratchet teeth. A slot and pin connection between the supporting arm and side member provides for the disengagement of the projection with the teeth. When a pin is placed in engagement with any one of the ratchet teeth, the spring in the roller exerts a contracting tendency on the part of the canopy of the awning which holds the latter in its adjusted position.

A practice is coming into vogue at the present time in the automobile industry, of manufacturing the doors of motor vehicle bodies in what might be characterized as two distinct types. I have reference to the round-cornered windows or doors, and the square-cornered ones. It is obvious that the ordinary known type of awning is adapted for use with either one of these types and not both. In view of this condition, it is a further object of the invention to provide a side awning which is readily adaptable for use with motor vehicle doors or windows of either of these types. This object is achieved by providing for an adjustment of either end of the awning in the window frame, and also by the fact that the awning is peculiarly adapted to have the window completely closed while in any one of its extended positions. The adjusting feature of either end of the awning is partially accommodated by the mounting of the same in the window frame previously noted, and further adjustment which is essential in order to adapt the awning for use with different types of car bodies as previously noted, is provided by adjustably mounting on the side members, roller carrying members. These members may be availed of to raise or lower either end of the roller without necessitating a change of the position of the side members themselves.

A further advantage incorporated into an awning made in accordance with this invention is that it is peculiarly adapted to the fitting of any size window. When it is considered that these windows are made in more than twenty-six sizes and it has heretofore been necessary for a dealer to carry awnings in anywhere from ten to twenty-six different sizes, this assumes importance. The use of the particular mounting of the side members together with the expanding tubular member, adapts the supporting framework of the awning to fit any size of window within a wide range, and it is only necessary for a retail merchant to tailor the size of the awning to any particular window which operation is easily carried out. It has been found that the manufacturer can make these awnings in two widely different sizes and thereby accommodate all the known motor vehicle bodies in providing them with these side awnings.

With these and other objects in view as those associated with the provision of the particular instrumentalities needed to attain the above objects, the invention comprises certain novel constructions, combinations, and arrangements of parts as will be subsequently specified and claimed.

For a full and more complete understanding of the invention, reference may be had to the following description and accompanying drawings, wherein Figure 1 is a showing of the awning as applied to the door of a motor vehicle body.

Figure 2 is a section taken about on the line 2—2 of Figure 1 with the window glass in a lowered position, looking in the direction indicated by the arrows.

Figure 3 is a view similar to Figure 2 but with the awning extended and the window glass in a closed position.

Figure 4 is a detailed view in side elevation of one of the side members together with the canopy supporting arm.

Figure 5 is a front view of the bracket shown in Figure 4.

Figure 6 is a detailed view in perspective of the tubular expanding device, parts being broken away and shown in section to bring out the arrangement on the interior thereof. This view shows the device when it is held in a contracted position by the fastening instrumentalities, the extended position being shown in Figure 7 which is a front view somewhat diagrammatic bringing out the relationship between the side members and the tubular extending members.

Fig. 8 is a detailed illustration in perspective bringing out the adjustable features of the awning carrying member and its mounting on the side member.

While a preferred specific embodiment of the invention is herein set forth, it is to be understood that I am not to be limited to the exact constructions illustrated and described, because various modifications of these details may be provided in putting the invention into practice within the purview of the appended claims.

In the drawings I have shown fragmentarily a portion of a door of a vehicle body which is designated A. This door includes the window frame or sash B to which my novel side awning is to be applied. Sash B includes the side frame members 1 in which are formed grooves 2 lined with pieces of felt designated 3. This construction of the door is conventional and practically universal throughout the vehicle body art.

Referring now to Figures 4 and 5, one of the side members which carry the roller and canopy supporting arms, comprises a main body flange 4 which is adapted to be interposed between one of the felt pieces 3 and the edge of the groove 2. One edge of the main body flange 4 which may be made of any suitable metal, preferably sheet metal, is turned over to provide flange 5 which is adapted to abut against side frames 1. Near the upper end the flange 5 is deformed and there is provided a sort of tubular protuberance or projection 6 which is adapted to receive one end of the tubular expanding device to be hereinafter described in detail. The upper end of the main body portion 4 is turned over to provide a depending arm 7 and an upper limiting stop 8 in the form of the bent portion for the window element. It is noted that this bent portion is cut away as shown at 9 to accommodate the felt pieces 3. The depending arm 7 is provided with a small flange 10 which extends in the same direction as the flange 5 and this flange 10 is formed with a vertically extending slot 11. A roller carrying member 12 is provided with a slot 13 and bolt and nut instrumentalities shown at 14 cooperate with slots 11 and 13 in flange 10 and roller carrier 12 to provide for the relative adjustment between these parts. When the screw bolt is tightened movement between the parts is inhibited and the roller carrier member will be held positively in position. It is noted that one of the roller carriers 12 is provided with the notch shown at 15 to provide for the placing in position of the roller. Attention is called to the fact that the other roller carrier member will be provided with a non-circular opening, so that the spring roller may be properly held in position.

Adjacent the lower end of the side member, the flange 5 is enlarged and deformed to provide the ratchet teeth or claws 16. In this instance four of these teeth are shown arranged in a sort of semi-circular arrangement, although it will be readily appreciated that a variety in number of teeth and arrangement thereof might well be availed of. Substantially centrally arranged with respect to the claws 16 is a pin or rivet member 17 which pivotally fastens a side supporting arm 18 to the side member. This side supporting arm 18 has slot 19 therein through which the rivet 17 extends, thereby permitting a shifting action between the arm and the ratchet teeth. This is important as it provides for an engagement or disengagement of a projection or headed pin 20 carried by the arm 18 with claws 16. The arm may be pulled outward and swung so that the pin 20 may be placed in engagement with any one of the claws 16.

When my novel awning is to be applied to the window opening in a door, the side members are placed in position by inserting main body flange 5 between the felt inside of the groove and the outer wall of said groove as previously mentioned. The friction created is such to hold these in position pending the placing in position of the expanding device comprising tubular members 21 and 22 in which is located a spring 23 constantly tending to expand or spread apart these members. The ends of the spring bear against an abutment in one of the tubular members, and the end of the other telescopes therein. It is noted that the ends of these tubular members 21 and 22 fit over the projections 6 on the side member.

When the awning is assembled at the place of manufacture, a pin 24 is inserted in openings 25 in the tubular members 20 and 22, these openings being placed in alignment to hold the expanding device in a contracted condition. When the awning is installed on the door of a vehicle, the pin may be removed whereupon the expanding device functions as intended.

A roller 26 of the well known tension spring type is carried by the roller carrier members 12 and has rolled up thereon an awning or canopy 27 which is usually of fabric, although any material might well be availed of. At its free end this canopy is fastened to a rod 28 which is pivotally carried between the supporting arms 18 providing a spreader member. Needless to say, the tendency of the spring in the roller 26 is to constantly wind up the canopy. When the awning is installed, it may be extended by pulling upwardly on the rod 28 so as to bring the rivets 17 to one end of the slots 19 whereupon the headed pins will be out of the path of engagement with any of the claws 16. The awning may then be pulled out and upon a sort of inward force being applied to the rod 28 the headed pins 20 will engage the claws 16 which will hold the awning in the desired extended position. The spring in the roller 26 functions to carry out this action.

It is readily appreciated that the awning may be placed in any desired angular relation with respect to the window frame inasmuch as the flanges 5 may be moved up or down between the felt pieces 3 and the edge of the groove 2. Further adjustment as between the roller and the side members themselves is taken care of by the pin and slot connection between the roller 12 and the side members. Figure 3 brings out the relation of the various parts of the awning when the window element is closed tight. In order to close the awning, all that is necessary is to lower the window and disengage the headed pins 20 from the claws 16.

Having thus described my invention, what

I claim as new and desire to secure by Letters Patent of the United States, is:—

1. An awning structure adapted to be mounted upon an automobile window frame, comprising, in combination, side members having means for frictionally holding the side members in engagement with the window frame, a spring roller, means extending from the side members for holding the spring roller, an awning adapted to be wound upon said roller, a spreader member having slidable and pivotal connection with the side members, stop means carried by said side members, and projections on said spreader member engageable with said stop means, said awning being adjustable to different positions and held in such adjusted positions by the spring tension of said spring actuated roller, the roller being positioned at one side of the window frame and the spreader member and side members being positioned at the other side of the window frame.

2. In an awning, comprising, side members connected to a frame of a vehicle window, each member having a ratchet sector adjacent one end, and having in proximity to its other end, a protuberance, a narrow U-shaped neck thereon, a limiting stop thereon, and at the end of each side member, a vertical slotted flange, a vertical slotted roller carrying member mounted adjustably on each flange, a clamping bolt mounted in each slot, a tension roller mounted in and between the carrying members, there being formations in each carrying member to mount the tension roller therein, a supporting arm slidably and pivotally mounted on each side member, a headed pin projecting laterally from each supporting arm and engaging the ratchet teeth to provide varied angular adjustment for the supporting arm, a canopy, one end of which is connected to the tension roller mounted interiorly of the window, the other end connected to a rod pivotally carried between the supporting arms exteriorly of the window, and a tubular expanding member interposed between the side members and contacting with the protuberances.

3. An automobile awning and associated fixture, the same comprising side members having portions to fit in the window slit grooving of an automobile window, each side member being equipped at its upper end with an inwardly and downwardly extending part the uppermost portion of which is adapted to fit in the upper horizontal groove which receives the upper edge of the window, a canopy roller mounted on the downwardly extending portion of said inwardly and downwardly extending part, a canopy arranged to unroll from said roller to extend out from the window but adapted to be pressed by the window up into the upper horizontal groove of the window frame by reason of the provision of the said upwardly and downwardly extending parts of the side members, a retaining means interposed between the side members, and adjustable canopy supporting arms carried by the lower ends of the side members to hold the canopy outstretched at different adjustments according to the amount of shade desired.

4. An automobile awning and associated fixture, the same comprising side members having portions to fit in the window slit grooving of an automobile window, each side member being equipped at its upper end with an inwardly and downwardly extending part the uppermost portion of which is adapted to fit in the upper horizontal groove which receives the upper edge of the window, the mounting means between the downwardly extending portion of the inwardly and downwardly extending parts of the side members, comprising the carrying members in the form of brackets, and adjustable attaching means for said carrying members, connecting them with the said downwardly extending portions, and a tubular expending member interposed between the side members.

5. An awning structure comprising a canopy carrying frame comprising a standard positioned along each side of an automobile window frame exteriorly of window glass within the frame, means supported by the standards for rigidly supporting a canopy exteriorly of the window, the uppermost portions of the standard being shaped to fit closely into the top window slit groove of the window frame to permit closing of the window without interference, a tension roller supported by the standards and positioned interiorly of the window, and a canopy carried by the roller and interposed between the window glass and rigidly supported exteriorly of the window when extended while permitting at all times uninterfered normal operation and closing of the glass in the window.

6. An awning structure comprising a canopy carrying frame comprising a standard positioned along each side of an automobile window frame exteriorly of window glass within the frame, the uppermost portions of the standards being formed to fit closely into a top window slit groove of the window frame to permit closing of the window without interference, the said uppermost portions also extending downwardly interiorly of the window frame, a tension roller carried by the downwardly extending portions interiorly of the window, and a canopy carried by the roller and interposed between the window frame and the top of the window glass and permitting at all times uninterrupted normal operation and closing of the glass in the window.

7. An awning structure comprising a canopy carrying frame comprising a standard positioned along each side of a window frame exteriorly of window glass within the frame, each standard terminating in an extension bent to snugly fit into a top window slit groove of the window frame to permit substantially complete closing of the window without interference, the bent portions of the extensions extending interiorly of the window, a tension roller carried by the bent portions and positioned interiorly of and adjacent to the window, and a canopy carried by the roller and interposed between the window frame and the top of the window glass and permitting at all times uninterrupted normal operation and closing of the glass in the window.

8. An awning structure comprising a canopy carrying frame comprising a standard positioned along each side of a window frame exteriorly of window glass within the frame, each standard terminating in an extension bent to snugly fit into a top window slit groove of the window frame to permit substantially complete closing of the window without interference, the bent portions of the extensions extending interiorly of the window and downwardly adjacent the inside thereof, a roller carrying bracket mounted on the downwardly extending portions of the extensions, each bracket being positioned interiorly of the window, a tension roller mounted on the brackets, and a canopy carried by the roller and interposed between the window frame and the top of the window glass, and permitting at all times uninterrupted normal operation and closing of the window glass.

9. An awning structure comprising a canopy carrying frame comprising a standard positioned along each side of a window frame exteriorly of window glass within the frame, each standard terminating in an extension bent to snugly fit into a top window slit groove of the window frame to permit substantially complete closing of the window without interference, the bent portions of the extensions extending interiorly of the window and downwardly adjacent the inside thereof, a roller carrying bracket mounted on the downwardly extending portions of the extensions, each bracket being positioned interiorly of the window, a tension roller mounted on the brackets, and a canopy carried by the roller and interposed between the window frame and the top of the window glass and permitting at all times uninterrupted normal operation and closing of the window glass.

10. An awning structure comprising a canopy carrying frame comprising a standard positioned along each side of a window frame exteriorly of window glass within the frame, each standard terminating in an extension bent to snugly fit into a top window slit groove of the window frame to permit substantially complete closing of the window without interference, the bent portions of the extensions extending interiorly of the window and downwardly adjacent the inside thereof, a tension roller carried by the bent portions and positioned interiorly of and adjacent to the window, a canopy carried by the roller and interposed between the window frame and the top of the window glass and permitting at all times uninterrupted normal operation and closing of the glass in the window, means carried by the standards for rigidly supporting the canopy exteriorly of the window, and extensible means secured to the standards for adjustment thereof into snug engagement with the window frame.

11. An awning structure comprising a canopy carrying frame comprising a standard positioned along each side of a window frame exteriorly of window glass within the frame, the uppermost portions of each standard being formed to fit snugly into a top window slit groove of the window frame to permit closing of the window without interference, the formed portions also extending interiorly of the window, a tension roller carried by the interiorly extending portions and positioned adjacent the inner surface of the window, and a canopy on the roller, the canopy being extensible through the window and to be interposed between the top of the window glass and the top of the window frame, the canopy being also adapted to be drawn over the exterior surface of the glass, the canopy carrying frame snugly fitting the window frame but being readily demountable therefrom without likelihood of marring the finish of the frame.

12. An awning structure comprising a canopy carrying frame comprising a standard positioned along each side of a window frame exteriorly of window glass within the frame, the uppermost portions of the standards being formed to fit snugly into a top window slit groove of the window frame and also extending interiorly of the window while permitting closing of the window without interference, an extensible spacing member for holding the standards adjustably apart and snugly against the sides of the frame, resilient means for maintaining the spacing member in extended position to maintain the standards pressed in position against the window frame, a tension roller carried by the standards interiorly of the window, and a canopy on the roller interposed between the top of the window frame and the top of the window glass and permitting at all times uninterrupted normal operation and closing of the glass in the window.

13. An awning structure comprising a canopy carrying frame comprising a standard positioned along each side of a window frame exteriorly of window glass within the frame, the uppermost portions of the standards forming extensions shaped to fit snugly into a top window slit groove of the window frame, thereby permitting substantial closing of the window without interference, the extensions also extending interiorly of the window, a telescoping spacing member for holding the standards adjustably apart and snugly against the sides of the frame, a spring within the telescoping member for maintaining it in extended position to hold the standards pressed in position against the window frame, a tension roller mounted on the said extensions interiorly of the window, and a canopy on the roller interposed between the top of the window frame and the top of the window glass and permitting at all times uninterrupted normal operation and closing of the glass in the window.

In testimony whereof I affix my signature.

MELVIN L. CLELAND.